(No Model.)

T. STAHL.
FISHING FLOAT.

No. 441,447. Patented Nov. 25, 1890.

WITNESSES:
Chas. H. Luther Jr.
M. F. Bligh

INVENTOR:
Telesfor Stahl
by Joseph A. Miller & Co.
Attys

UNITED STATES PATENT OFFICE.

TELESFOR STAHL, OF PROVIDENCE, RHODE ISLAND.

FISHING-FLOAT.

SPECIFICATION forming part of Letters Patent No. 441,447, dated November 25, 1890.

Application filed May 15, 1890. Serial No. 351,954. (No model.)

*To all whom it may concern:*

Be it known that I, TELESFOR STAHL, of Providence, in the county of Providence and State of Rhode Island, have invented a new and useful Improvement in Fishing-Floats; and I hereby declare that the following is a full, clear, and exact description of the same, reference being had to the accompanying drawings, forming part of this specification.

My invention relates to improvements in fishing-floats; and it consists in the peculiar construction and arrangement of the parts, as hereinafter more fully set forth.

Figure 1:
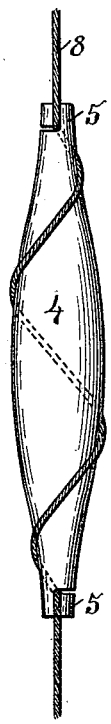
Figure 2:
Figure 3:
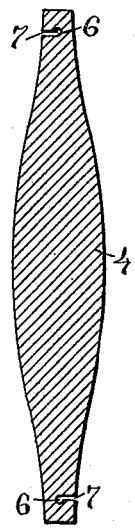

Figure 1 is a side elevation of my improved fishing-float. Fig. 2 is a front elevation of my improved fishing-float. Fig. 3 is a vertical section of my improved fishing-float.

The object of this invention is to construct a float so that it can be readily secured to and adjusted on a fishing-line and that will be held in the adjusted position more securely than floats as heretofore constructed.

In the drawings, the number 4 indicates the body of the float, which may be made solid or hollow and of any suitable material.

5 5 indicate the two opposite ends of the float. These ends are preferably made of less diameter than the central portion of the float.

6 6 indicate holes bored or formed transversely through the axis of the float near the ends 5, and the numbers 7 indicate transverse slots, the width of which is less than the diameter of the holes 6. These slots are formed so as to connect with the holes, the sides of the slots toward the center of the float forming a tangential line intersecting the inner sides of the holes 6, so that the holes form an enlargement of the slots in which the line 8 is held against accidental displacement.

In practice I form the slots 7 of such width that some strain is required to enter the line in the slots, and make the holes 6 sufficiently large, so that the line can be readily passed through the same. By drawing the line through one of the slots 7 into the hole 6 at one end of the float, passing the line once or twice around the float, and entering the line through the slot 7 into the hole 6 at the opposite end of the float the float will be firmly held against displacement when in use, and can be quickly adjusted by drawing in the line laid around the float on the end toward which it is desired to move the float. By the enlargement of the slots formed by the holes 6 the line in contact with the opposite ends of the holes 6 is held so that it cannot enter or be drawn out through the slots in using the fishing-line, as is the case with transverse slots not provided with these enlargements or holes 6.

Having thus described my invention, I claim as new and desire to secure by Letters Patent—

A fishing-line float provided near its ends with the transverse slots 7, having the enlargements at the bottoms of the slots formed by the holes 6, as described.

TELESFOR STAHL.

Witnesses:
J. A. MILLER, Jr.,
M. F. BLIGH.